Oct. 7, 1969  E. J. PETNER  3,470,615
DENTAL CROWNS FACED WITH POLYGLYCOL DIMETHACRYLATE
AND PROCESS FOR MAKING
Filed Aug. 18, 1965   3 Sheets-Sheet 2

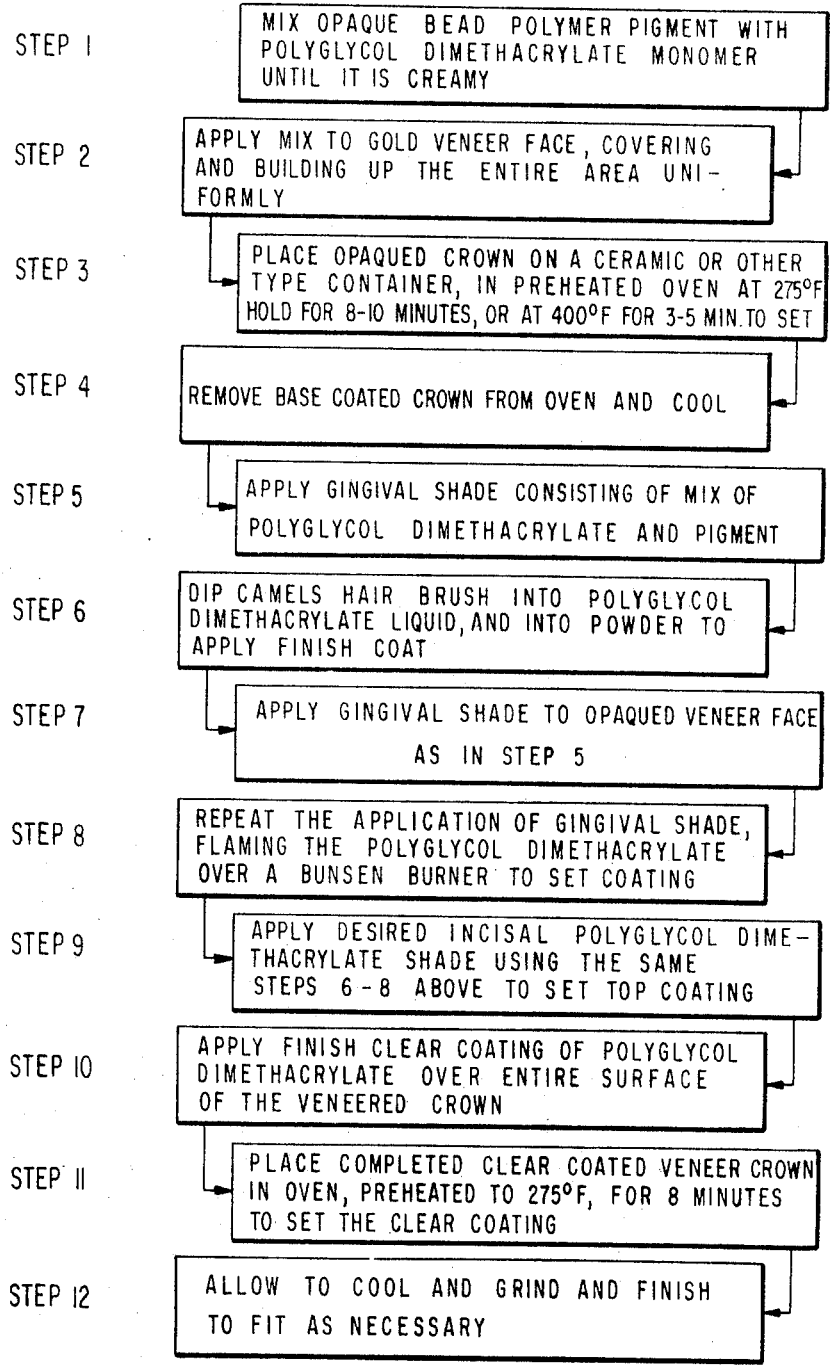

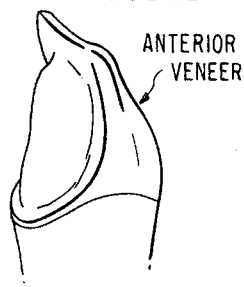

FIG. 2

ANTERIOR VENEER

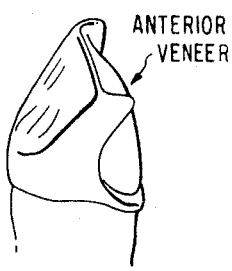

FIG. 3

ANTERIOR VENEER

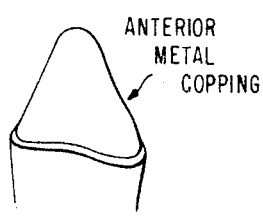

FIG. 4

ANTERIOR METAL COPPING

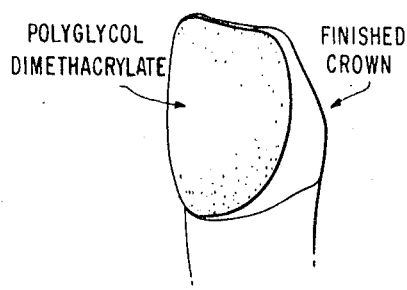

FIG. 2A

POLYGLYCOL DIMETHACRYLATE

FINISHED CROWN

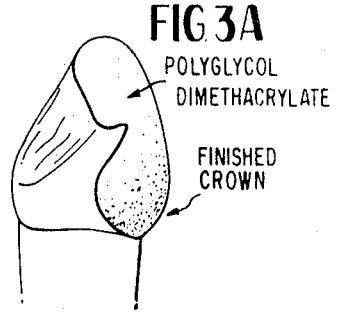

FIG. 3A

POLYGLYCOL DIMETHACRYLATE

FINISHED CROWN

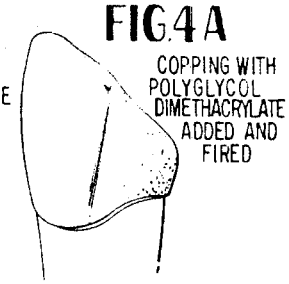

FIG. 4A

COPPING WITH POLYGLYCOL DIMETHACRYLATE ADDED AND FIRED

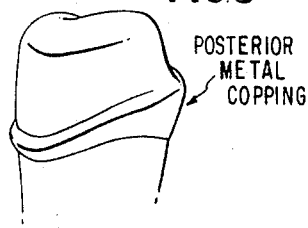

FIG. 5

POSTERIOR METAL COPPING

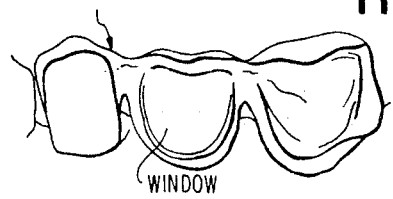

FIG. 6

METAL PONTIC

WINDOW

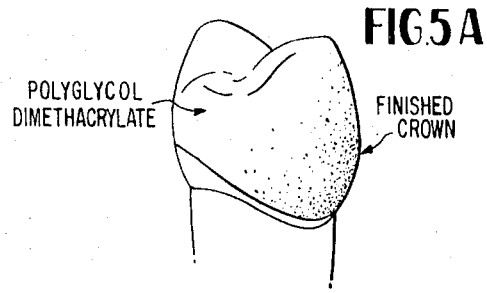

FIG. 5A

POLYGLYCOL DIMETHACRYLATE

FINISHED CROWN

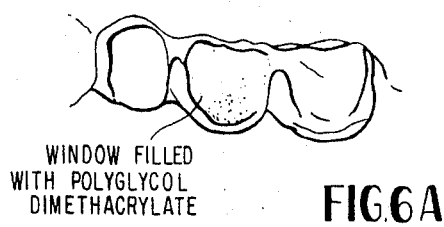

WINDOW FILLED WITH POLYGLYCOL DIMETHACRYLATE

FIG. 6A

INVENTOR
EUGENE J. PETNER

BY
ATTORNEY

Oct. 7, 1969             E. J. PETNER           3,470,615
DENTAL CROWNS FACED WITH POLYGLYCOL DIMETHACRYLATE
AND PROCESS FOR MAKING

Filed Aug. 18, 1965                           3 Sheets-Sheet 3

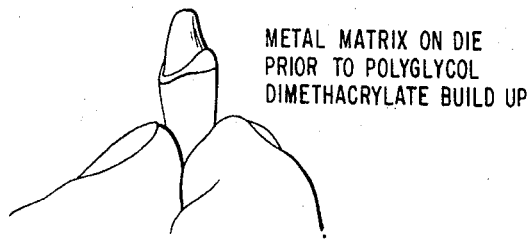

FIG.7A

METAL MATRIX ON DIE PRIOR TO POLYGLYCOL DIMETHACRYLATE BUILD UP

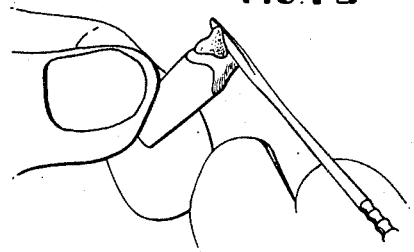

FIG.7B

BUILDING UP POLYGLYCOL DIMETHACRYLATE

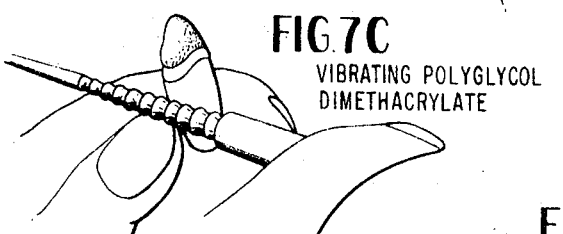

FIG.7C

VIBRATING POLYGLYCOL DIMETHACRYLATE

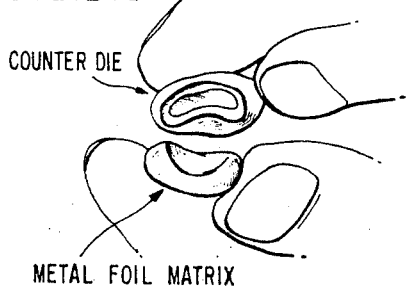

FIG.8A

COUNTER DIE

METAL FOIL MATRIX

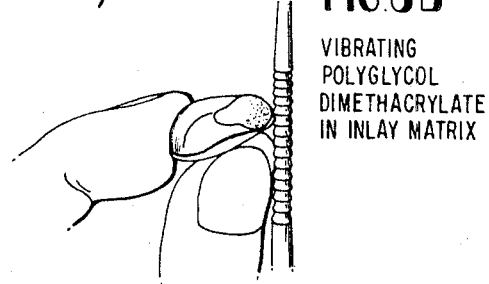

FIG.8B

VIBRATING POLYGLYCOL DIMETHACRYLATE IN INLAY MATRIX

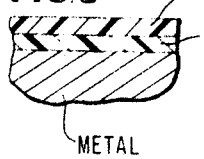

FIG.9

TOP COAT— POLYGLYCOL DIMETHACRYLATE

UNDERCOAT— PIGMENTED ADHESIVE TETRAPOLYMER DISSOLVED IN POLYGLYCOL DIMETHACRYLATE

METAL

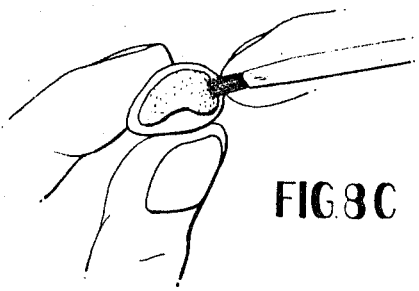

FIG.8C

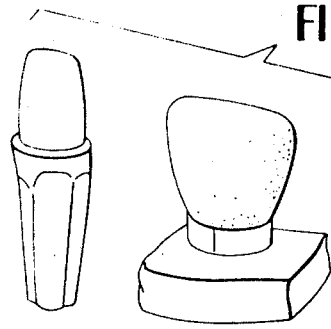

FIG.8D

FULL CROWN BUILT UP OF POLYGLYCOL DIMETHACRYLATE ON A METAL MATRIX AND REMOVED FROM DIE.. CROWN WILL NOW BE PLACED IN FURNACE FOR FIRING.

INVENTOR
EUGENE J. PETNER

BY *(signature)*

ATTORNEY

United States Patent Office 3,470,615
Patented Oct. 7, 1969

3,470,615
DENTAL CROWNS FACED WITH POLYGLYCOL DIMETHACRYLATE AND PROCESS FOR MAKING
Eugene J. Petner, Philadelphia, Pa., assignor to Williams Gold Refining Company, Inc., Buffalo, N.Y.
Filed Aug. 18, 1965, Ser. No. 480,626
Int. Cl. A61c 5/08; B32b 15/08; C08g 51/04
U.S. Cl. 32—12                              10 Claims

ABSTRACT OF THE DISCLOSURE

Dental crowns faced with a thickened polymerizable resin composition over the rigid dental base and method of manufacturing, the resin components of the composition consisting of polyglycol dimethacrylate selected from the group consisting of diethylene glycol dimethacrylate, triethylene glycol dimethacrylate, tetraethylene glycol dimethacrylate and polyethylene glycol dimethacrylate having an ethylene glycol degree of polymerization $n$ which has a value of from 4 to 6 as the liquid phase and the solid methacrylate ester polymer dissolved in the liquid phase in amounts which are sufficient to thicken it, said methacrylate ester polymer having imbibed organic peroxide left over from its polymerization which assists the formation of a polymerized solid coating over the base. The resin coating which adheres to the base is produced simply by heating to a temperature of 250–450° F. for 20 to 2 minutes, the longer time being for the lower temperature. The resulting coating is unusually hard, resistant to staining and extremely resistant to weight loss during polymerization and during any shaping steps which may be employed in moving the liquid coating over parts of the base. The coating may be heated with an open flame without suffering substantial weight loss.

---

This invention relates to a new method for making plastic faced dental crowns and to new dental crowns which are faced with polyglycol dimethacrylate as the principal polymerizable facing material to produce a unique resin facing over the metal of the crown support. This unique resin facing possesses outstanding properties of hardness comparable to that of dental porcelain, resistance to staining, excellent wear resistance, improved color stability compared with conventional dental acrylics, and remarkable resistance to weight loss during polymerization and shaping.

The processing temperatures during self-polymerization vary from about 250° F. for heat treatment of 8–20 minutes up to 400–450° F. for 3–5 minutes. The latter is the temperature which may be achieved in a pass of the appliance through an open flame.

The polyglycol dimethacrylate material which comprises the essential component of the hard plastic facing material adheres tenaciously to the underlying metal whether the crown is formed of noble metal, e.g. gold, silver, platinum, iridium, palladium or rhodium, or whether it is made of cheaper materials, e.g. stainless steel, nickel-iron alloy, titanium alloy, aluminum or aluminum alloy, chromium-iron alloy, copper or copper alloy, bronze alloy, etc. As a result of the tenaciousness of adhesion, hardness of the cured material, its unique resistance to staining, its excellent color stability and its aging stability, the wear resistance of the finished crown is far beyond that observed with any other dental plastic material; and, during the entire long denture life, the color and brilliance change far less than with comparable methyl methacrylate formulation which is the standard in the art. Thereby, the appliance maintains its natural and "new" look through its life.

It is believed that the advantages observed for the novel polyglycol dimethacrylate crown facing of the invention is due partly to the high transparency qualities exhibited by said dimethacrylate monomer which leads to faithful color reproducibility and high gloss using conventional dental pigments, partly to the extremely low volatility (less than 1 millimeter of mercury at 150° C. of triethylene glycol dimethacrylate) and partly to the extremely low solvency for acrylic polymer, acrylic-styrene copolymer and acrylic-carboxylic copolymer which are the types of polymer blended into polyglycol dimethacrylate to form the polymerizable dough mixture which serves the plastic medium which is applied to the metal base.

Table I illustrates the volatility of certain of the polyglycol methacrylates used in the present invention and a comparison is made with dibutyl phthalate as a standard in order to relate the properties of the polyglycol materials of the present invention to the standard.

The polyglycol methacrylates of the invention include diethylene glycol dimethacrylate, triethylene glycol dimethacrylate, tetraethylene glycol dimethacrylate and polyethylene glycol dimethacrylate in which the degree of polymerization $n$ of the polyglycol residue varies from $n=4$ to $n=6$.

The polyglycol methacrylates of the invention exclude ethylene glycol dimethacrylate which is not adequate as the main polymerizable binder ingredient of the crown facing because, in the form of the conventional dough, it shrinks excessively on curing, because it becomes so very highly strained on curing that it shatters on impact, and because its high solvency for the bead dental acrylic polymer makes its application quite difficult.

TABLE I.—TEMPERATURES IN ° C. OF LIQUID AT WHICH VAPOR PRESSURES ACHIEVE SIGNIFICANT VALUES

[In the range of 0.1–10 and 760 mm. Hg]

| Ester (deg.) | 0.1 mm. | 1 mm. | 5 mm. | 10 mm. | 760 mm. |
|---|---|---|---|---|---|
| Dibutyl phthalate (standard) | 113 | 148 | 180 | 195 | 340 |
| Triethylene glycol dimethacrylate (SR 205) | 115 | 150 | 168 | 185 | |
| Ethylene glycol dimethacrylate (SR 206) | | | 95 | 114 | 350 |
| Polyethylene glycol dimeth-acrylate n=4 to 6 (SR 210) | 105 | 145 | 160 | | |

The significance of the comparison which is made between ethylene glycol dimethacrylate and the polyethylene glycol dimethacrylate (SR 210 in Table I above) lies in the vapor pressure value which is exhibited at the temperature of the organic peroxide cure, e.g. a temperature of 80–100° C., which is observed in conventional dental dough curing system employing the closed flask technique (boiling water technique). Methyl methacrylate monomer boils at 100° C. and the vapor loss is so substantial that special training is required in manipulating the dental flask technique. Ethylene glycol dimethacrylate avoids this high volatility at 100° C. since its vapor is only about 5 mm., as seen in Table I. However, the cure and conversion of the liquid monomer to the solid state at temperatures above 100° C. will create substantial losses of monomer material in the form of vapor. In contrast, either of the two polyglycol dimethacrylates shown in Table I have a volatility of less than 0.1 mm. at a comparable temperature to that of the peroxide cure in the closed flask. These comparable temperatures are 105° C. and 115° C.

Relating the volatilities of the polyglycol dimethacrylates to the dibutyl phthalate standard, it is seen that these are of about the same order. Relating the volatilities of the monoglycol dimethacrylate (SR 206) and the polyglycol dimethacrylates (SR 205 and SR 210), one observes that the polyglycol dimethacrylates are substantially less volatile. Notice that in the temperature interval 95–105° C., the vapor pressure of SR 206 is 5 mm. (95°), while that of SR 210 is 0.1 mm. (105°).

Perhaps the 5 mm. vapor pressure would not be excessive but the highly strained, brittle product is inadequate as a facing for a metal crown.

An object of the invention is to provide a new and simple method for the manufacture of metal reinforced dental crowns faced with a heat-resistant, long-wearing, porcelain-like plastic which can resist the flame of the dentist's gas burner after being baked onto the metal support without cracking.

A further object is to provide a new heat-resistant, plastic-faced dental crown capable of being easily manufactured and easily matched to simulate natural teeth and to produce all of the advantages of the hardness of porcelain without requiring the expensive molding equipment and high temperature molding procedures which are necessary to make porcelain crowns or conventional acrylic resin crowns.

A further object of the invention is to provide a method for fabricating a metal reinforced dental structure which avoids the need for pressure packing in a closed mold and allows curing to proceed at high temperatures of from 250–450° F. for curing times varying from about 8–20 minutes at the lower temperature down to about 2–3 minutes at the higher temperature.

Other and further objects will become apparent by reference to the drawing illustrating certain preferred embodiments, it being understood that these are shown to illustrate but not to limit the spirit or scope of the invention.

In the drawing:

FIG. 1 shows a flow diagram of the steps of mixing, coating and heating in the preparation of a veneer gold crown in accordance with the invention;

FIGS. 2, 2A, 3, 3A, 4 and 4A show the steps of finishing crowns for anterior teeth in accordance with the invention;

FIGS. 5 and 5A show the steps of finishing a crown for a posterior tooth;

FIGS. 6 and 6A show the filling of a window in a metal pontic;

FIGS. 7A, 7B and 7C show the hand operations for building up polyglycol dimethacrylate onto the metal matrix and illustrate the stages of applying the plural coating and of vibrating the dough material after it has been applied to the base;

FIGS. 8A and 8B illustrate the use of the matrix and counter die in forming an inlay;

FIG. 8C shows the brush finishing of the inlay of FIG. 8B;

FIG. 8D illustrates the full crown build up on a metal matrix adapted for furnace firing; and FIG. 9 is a cross sectional view of a preferred veneer structure illustrating an opaque undercoat of pigmented tetrapolymer dissolved and dispersed in polyglycol dimethacrylate, this pigmented layer serving as a priming layer promoting adhesion to a top layer containing polymerized polyglycol dimethacrylate in which there is dispersed methyl methacrylate bead polymer or allyl (0.5–5.0%) cross-linked methyl methacrylate bead polymer.

The polyglycol dimethacrylate material is blended with conventional acrylic bead polymer to form a dental dough and an illustrative example of the dental dough is shown in Example I, below.

EXAMPLE I

This example illustrates the use of a 50—50 mixture of bead polymers, identified as a mixture of Type I superfine, and of 5% allyl cross-linked polymer. This mixture is termed "pyroplast" because of its heat resistance.

The following is the particle size of Type I superfine (suspension polymerized bead polymer consisting of methyl methacrylate polymer of molecular weight 635,000, contains 0.25% residual benzoyl peroxide):

Type I—Superfine

| | Percent |
|---|---|
| On 100 mesh | 2 |
| On 150 mesh | 6 |
| On 250 mesh | 53 |
| Through 250 mesh | 58 |

The following is the particle size of 5% allyl cross-linked polymer-bead polymer consisting of methyl methacrylate cross-linked with 5 parts per hundred of allyl methacrylate and suspension polymerized under the same conditions as Type I superfine above to provide a bead polymer product containing about 0.3% residual benzoyl peroxide.

5% allyl copolymer

| | Percent |
|---|---|
| On 100 mesh | 1 |
| On 150 mesh | 2 |
| On 250 mesh | 17 |
| Through 250 mesh | 80 |

Triethylene glycol dimethacrylate (SR 205) liquid, inhibited with about 60 parts per million of methyl ether of hydroquinone, was blended with the 50—50 mixture of beads (pyroplast powder) in a ratio of 1½ parts of liquid to 1 part of bead polymer to form a creamy mixture constituting a clear liquid blend. This clear liquid is the body resin mixture and is pigmented when applied over the primer. This clear liquid is not pigmented when applied as a transparent, pearlescent top-coating over the body portion. An outstanding characteristic of the clear top-coating is its vital or natural tooth appearance.

The body portion can be applied directly to the metal part of the appliance, as is seen in Table II hereinafter. However, it is preferred to use an opaquer primer containing the special adhesive tetrapolymer of Lal U.S. Patent No. 2,916,469, the best formula being that of Example I, this tetrapolymer being dissolved in the polyglycol dimethacrylate which constitutes the active self-polymerizing liquid ingredient of the primer. This liquid mixture is pigmented to make the primer opaque. The following is a recipe for solids of the opaque primer:

| Material | Parts by weight |
|---|---|
| Tetrapolymer of U.S. Patent No. 2,916,469, Example I | 20 |
| Pigment-titanium dioxide barium sulfate mixture (dental white) | 40 |
| Reinforcing extender—400 mesh aluminum oxide | 40 |

The pigment in the above typical recipe is adapted to be varied to match the natural tooth shades of adjacent teeth and it is contemplated that small amounts of cadmium red, cadmium yellow, carbon black, ultramarine blue, burnt umber and the like can be blended to achieve the desired shade.

Reference is now made to FIG. 1 of the drawing which illustrates, in flow sheet form, the simple yet novel method of mixing the materials and applying the so-mixed materials to the crown support.

For convenience, the following description of the novel method steps identifies the adhesive tetrapolymer of Lal, U.S. Patent No. 2,916,469, as the opaquer; but it should be understood that any of the adhesive polymers shown in this Lal patent can be used to enhance the adhesion of the polyglycol dimethacrylate dough or the liquid, per se, to the metal crown substrate. As little as 3 parts of the tetrapolymer per 100 parts of liquid polyglycol dimethacrylate produce a significant enhancement of adhesion. More than 20 parts per 100 parts of pigment opaquer composition (the balance is pigment) is wasteful of the tetrapolymer and does not produce any improvement in adhesion commensurate with the addition made.

Other adhesion promoting resins may be employed than those which are disclosed in the Lal patent as, for example, a copolymer of methyl methacrylate (80%) and ethyl methacrylate (20%), or a tripolymer of methyl methacrylate (80%), ethyl methacrylate (15%) and methacrylic acid (5%). These can be used in the same proportion as the tetrapolymer in the above recipe. The best performance is achieved with the Lal tetrapolymer of this example.

FIG. 9 illustrates a crown in cross section, formed of metal, which is primed with an undercoat of pigmented adhesive tetrapolymer, preferably as beads, dissolved in the polyglycol dimethacrylate, the proportions of 2 parts of the solids to 1 part of liquid polyglycol dimethacrylate monomer providing the best working consistency for manual facing and restoring.

The technique of applying the opaque primer coating, the body shade coating and the top clear coating employs the well known manual spatula, vibrating tool and brush coating implements used in preparing standard acrylic dental fillings. In contrast to the standard molding and casting procedures, the present manual coating procedure totally obviates the need for high pressure molding elements and high pressure valves or piping, and for low pressure molding equipment, and even eliminates the female single mold form or multi-part casting forms for atmospheric casting.

It is surprising that the combination of underlying metal and the novel resin composition uniquely lends itself to a simple, manual coating operation which can produce a flame-resistant, non-porous, resin-faced crown having outstanding porcelain-like characteristics. These techniques are specifically shown in FIGS. 2–8, inclusive.

The new coaction of metal base and resin mixture forming the unpigmented creamy composition of methyl methacrylate polymer beads dissolved in polyglycol dimethacrylate monomer forms a finished crown which possesses remarkable resistance to high temperature after it is set; and this creamy mixture is non-volatile at curing temperatures so that it is uniquely suitable for building a hard, glossy, wear-resistant surface which can be set by flaming and can be delicately shaded to make age-resistant simulations of natural teeth.

The crown structure of the present invention shows a high resistance to discoloration when tested in accordance with the test of Kapsimalis, Evans and Sterling described in "Color Stability and Resistance to Staining of Resin Veneer Materials," Journal of Prosthetic Dentistry, vol. 14, No. 5, September-October 1964. By this test, non-volatile commercial epoxy resin materials, vinyl resin materials and commercial polymethacrylate materials are inferior to the present product.

The preferred crown product employs the noble metal base, especially gold, because of its tolerance by human tissue and its recognized close-fitting properties, as the support for partial or complete restorations. The polyglycol dimethacrylate is applied in the form of the adhesive undercoat containing the pigmented tetrapolymer, as shown in step one of FIG. 1 and in FIG. 9, and the thickness is built up by following the successive steps 2–11, inclusive, shown in the flow diagram of FIG. 1. The opaquer mix is preferably fired in a preheated oven, as shown in step 3 of FIG. 1, but it may be heated by other means.

A typical pigmentation for the gingival shade is formulated as follows:

STAIN MIXTURE

| Standard dental stain: | Percent of pigment |
|---|---|
| White (Titanium Dioxide) | 2.00 |
| Fluorescence (Fluorescent Zinc Oxide) | 5.00 |
| Yellow (Cadmium Sulfide Yellow) | 0.25 |
| Orange (Cadmium Sulfide Orange Grade) | 0.50 |
| Black (Carbon Black) | 0.10 |

These stains are then combined in a typical batch formulation, such as:

| Stain mixture | Parts | Percent of pigment | Pigment content |
|---|---|---|---|
| Clear | 4,000X | 0.00 | 0.00 |
| Fluorescence | 640X | 5.00 | 32.00 |
| White | 355X | 2.00 | 7.10 |
| Yellow | 217X | 0.25 | 0.54 |
| Orange | 174X | 0.50 | 0.87 |
| Black | 360X | 0.10 | 0.36 |
| | 5,746 | | 40.87 |

The foregoing batch is used as the source material for pigmenting the body and incisal areas of the crown. In this regard, note that the total pigment content can be lightened in steps 5, 7 and 9 of FIG. 1 so that the average amount of pigment introduced for staining in the top coat of FIG. 9 is 0.71%.

By cutting down both stain and pigment, the transparency of the top coat is emphasized.

The resin layer thickness which is applied in step 2 above is about 1/64". Within five minutes after application to the gold matrix, the cured crown can be removed from the 400° F. oven as is shown in step 3 of FIG. 1. This advantage of quick curing, whether for 5 minutes at 400° F. or for 10 minutes at 275° F., completely eliminates the need for pressure packing the crown and resin parts in a closed mold as carried out by the conventional operation.

In this regard, attention is invited to the conventional acrylic practice in Pos, U.S. Patent No. 2,930,124.

Also, notice Weinstein et al., U.S. Patent No. 3,052,983, which illustrates the method for making metal reinforced porcelain covers and shows a complicated and lengthy procedure for a replacement crown.

The present invention eliminates the difficulties of the prior porcelain and acrylic resin procedures.

Another important and unique step of the process for building up the top "stained" coating is the flame curing shown in step 8 of the flow diagram of FIG. 1. The ordinary Bunsen burner flame fuses the polyglycol dimethacrylate binder to polymerize the layer and set it substantially instantaneously. The shaded layers which are applied in steps 5 and 7 are each fixed in the precise location intended by the simple expedient of using the Bunsen burner. If the binder material were the conventional methyl methacrylate syrup or dough, it would evaporate, the polymer would depolymerize and the vapor would ignite to completely destroy the product.

Dental restoration, crown manufacture and crown repair can be achieved in accordance with the method of the present invention by the use of oven or flame heating means and these means have never had any practical application in this field heretofore.

To illustrate the uniqueness of polyglycol dimethacrylate-faced metal crown of the invention, reference is made to the testing which is briefly summarized in Table II below.

As mentioned earlier, the opaquer powder in Sample Numbers 1, 2 and 3 in the table below contains 20% of the tetrapolymer shown in Example 1 of Lal U.S. Patent No. 2,916,469 and 80% of titanium dioxide, barium sulfate and aluminum oxide in the stated proportions. This mixture contains an amount of 0.75% benzoyl peroxide by weight of the mixture. The proportion of opaquer to monomer in each of SR 205, SR 209 and SR 210 is 2:1. Each composition in Table II constitutes a liquid adhesive which was applied in a thickness of 0.0005" in a tensile strength test utilizing three pieces of gold, cementing the center piece so that it lapped both end pieces giving a one-quarter square inch surface of bond to each of the end pieces.

TABLE II.—TENSILE BREAKING STRENGTH
[Total pounds pull prior to fracture]

| Sample No. | Composition Description | Total pounds pull |
|---|---|---|
| 1 | SR 205+opaquer | 40–50 |
| 2 | SR 209+opaquer | 60–80 |
| 3 | SR 210+opaquer | 70–80 |
| 4 | SR 205+50:50 mixture of Type 1 Superfine and 5% allyl polymer. | 40–50 |
| 5 | SR 205+filler peroxide mixture containing no polymer. | 40–50 |

SR 205=triethylene glycol dimethacrylate. SR 209=tetra-ethylene glycol dimethacrylate. SR 210=polyethylene glycol dimethacrylate, degree of polymerization n=4 to 6.

From the foregoing it will be seen that the Lal adhesive tetrapolymer increases the pull strength from 25–100%. It is also seen that the adhesive strength of the tetraethylene glycol dimethacrylate adhesive of sample composition 2 is about equivalent to the polyethylene glycol dimethacrylate adhesive of composition 3. Both of these have higher adhesion test values than triethylene glycol methacrylate. The adhesion value of the triethylene glycol dimethacrylate appears to be less benefited by adding the Lal tetrapolymer than the tetraethylene glycol dimethacrylate composition.

From the foregoing example, it will be appreciated that the manual coating steps 1–12 illustrated in FIG. 1 represent a preferred simple yet fast embodiment of building up a flame-resistant metal crown in accordance with the present invention which will enable the production of high quality restorations at low cost with hand labor and in the absence of expensive and cumbersome molding equipment or the need for accurate molds used in casting. The dentist and dental technician are furnished a new resin system having the advantages of porcelain and eliminating some known defects of the dental methacrylate materials.

Especially in respect to the staining, craze-resistance, color resistance and blushing tests which are the standard tests of American Dental Association Specification No. 15, effective July 1, 1958, is the present crown found to be better than conventional methacrylate teeth. The impact strength of the water-soaked, finished crown of the present invention is comparable to that of porcelain and better than of those porcelain teeth which were tested by the inventor and are described in the paper by Kulp, Lee and Fox, "An Impact Test for Dental Porcelain," Journal of Dental Research, November-December 1961, pages 1136–1141.

I claim:

1. A method of manufacturing a flame-resistant resin-coated supported structure comprising applying a thickened liquid polymerizable resin composition to a base by coating, the resin components of said composition consisting of polyglycol dimethacrylate selected from the group consisting of diethylene glycol dimethacrylate, triethylene glycol dimethacrylate, tetraethylene glycol dimethacrylate and polyethylene glycol dimethacrylate having an ethylene glycol degree of polymerization $n$ which has a value of from 4 to 6 as the liquid phase and solid methacrylate ester polymer dissolved therein in an amount sufficient to thicken said liquid phase, said polymer having imbibed organic peroxide left over from its polymerization for aiding the setting of said composition, and heating said base and coating to a temperature of about 250–450° F. for about 20 to 2 minutes to polymerize and cure said coating.

2. A method of manufacturing a noble metal crown by the process as claimed in claim 1, comprising applying a thickened creamy liquid resin composition to a noble metal base, the resin of said composition consisting of a polyethylene glycol dimethacrylate having an ethylene glycol degree of polymerization $n$ which has a value of from 4 to 6 having dissolved therein methyl methacrylate bead polymer.

3. A method as claimed in claim 2, wherein said creamy liquid is pigmented with a dental pigment to simulate a natural tooth shade.

4. A method of manufacturing a noble metal crown by the process steps as claimed in claim 1, comprising applying a creamy liquid resin composition to a noble metal base, the resin of said composition consisting of a polyethylene glycol dimethacrylate having an ethylene glycol degree of polymerization $n$ which has a value of from 4 to 6 having dissolved therein a mixture of equal parts of methyl methacrylate bead polymer and 5% allyl methacrylate cross-linked methyl methacrylate bead polymer.

5. A method as claimed in claim 4, wherein said creamy liquid is pigmented with a dental pigment to simulate a natural tooth shade.

6. A method as claimed in claim 5, wherein said creamy liquid is applied over a primer coating applied to said metal, said primer coating comprising a minor proportion of a tetrapolymer of 60% methyl methacrylate, 20% styrene, 15% acrylonitrile and 5% methacrylic acid dissolved in polyethylene glycol dimethacrylate having an ethylene glycol degree of polymerization $n$ which has a value of from 4 to 6, said primer coating being set by heating to a temperature of 250–450° F. for from 20 to 2 minutes before coating with said creamy coating.

7. A method as claimed in claim 6, wherein said primer coating is mixed with a dental pigment and finely divided aluminum oxide as a reinforcing material.

8. A flame-resistant resin-coated metal structure consisting essentially of a base support coated with a heat-set polymerized resin composition in which the resin consists of polyethylene glycol dimethacrylate having an ethylene glycol degree of polymerization $n$ which has a value of from 4 to 6 having dissolved therein solid methacrylate ester polymer in minor proportion which thickens the dimethacrylate.

9. A noble metal crown consisting essentially of a metal support coated with a heat-set resin composition in which the resin consists of polyethylene glycol dimethacrylate having an ethylene glycol degree of polymerization $n$ which has a value of from 4 to 6 having dissolved therein methacrylate ester polymer in minor proportion.

10. A crown as claimed in claim 9, wherein said base is provided with a primer consisting of a tetrapolymer of 60% methyl methacrylate, 20% styrene, 15% acrylonitrile and 5% methacrylic acid in amount up to 20% dissolved in polyethylene glycol dimethacrylate having an ethylene glycol degree of polymerization $n$ which has a value of from 4 to 6, said primer coating being set by heating.

References Cited

UNITED STATES PATENTS

| 3,300,547 | 1/1967 | Gorman et al. | 260—885 |
| 2,120,006 | 6/1938 | Strain | 260—89.5 |
| 2,420,570 | 5/1947 | Shapiro | 32—8 |
| 3,265,202 | 8/1966 | Cornell | 264—19 |
| 2,486,327 | 10/1949 | Rothwell | 264—16 X |
| 2,558,139 | 6/1951 | Knock et al. | 32—12 X |
| 2,886,890 | 5/1959 | Schnell | 264—16 X |
| 2,916,469 | 12/1959 | Lal | 260—41 |
| 3,012,287 | 12/1961 | Tucker | 264—20 |

WILLIAM D. MARTIN, Primary Examiner

R. HUSACK, Assistant Examiner

U.S. Cl. X.R.

117—75, 132, 161, 136, 137, 33.5; 264—19, 20